US012577144B2

(12) United States Patent
Suzuki et al.

(10) Patent No.: US 12,577,144 B2
(45) Date of Patent: Mar. 17, 2026

(54) GLASS MATERIAL

(71) Applicant: NIPPON ELECTRIC GLASS CO., LTD., Otsu (JP)

(72) Inventors: Futoshi Suzuki, Otsu (JP); Tadahito Furuyama, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 442 days.

(21) Appl. No.: 17/798,117

(22) PCT Filed: Mar. 23, 2021

(86) PCT No.: PCT/JP2021/011975
§ 371 (c)(1),
(2) Date: Aug. 8, 2022

(87) PCT Pub. No.: WO2021/193627
PCT Pub. Date: Sep. 30, 2021

(65) Prior Publication Data
US 2023/0083317 A1 Mar. 16, 2023

(30) Foreign Application Priority Data
Mar. 27, 2020 (JP) ................................ 2020-057836

(51) Int. Cl.
| | |
|---|---|
| *C03C 3/068* | (2006.01) |
| *C03C 3/15* | (2006.01) |
| *C03C 4/08* | (2006.01) |
| *G02F 1/00* | (2006.01) |
| *G02F 1/09* | (2006.01) |

(52) U.S. Cl.
CPC ................ *C03C 3/068* (2013.01); *C03C 3/15* (2013.01); *C03C 4/085* (2013.01); *G02F 1/0036* (2013.01); *G02F 1/093* (2013.01)

(58) Field of Classification Search
CPC ........... C03C 3/068; C03C 3/15; C03C 4/085; G02F 1/093
See application file for complete search history.

(56) References Cited

U.S. PATENT DOCUMENTS

| | | | |
|---|---|---|---|
| 3,971,723 A | 7/1976 | Tajima et al. | |
| 2017/0362119 A1 | 12/2017 | Dejneka et al. | |
| 2019/0210912 A1 * | 7/2019 | Suzuki | C03C 3/15 |
| 2019/0389761 A1 * | 12/2019 | Suzuki | C03C 23/007 |

FOREIGN PATENT DOCUMENTS

| | | | |
|---|---|---|---|
| JP | 51-046524 B2 | 12/1976 | |
| JP | 52-032881 B2 | 8/1977 | |
| JP | 55-042942 B2 | 11/1980 | |
| JP | 2018-058739 A | 4/2018 | |
| JP | 2018062456 A * | 4/2018 | C03C 3/062 |
| JP | 2018118870 A * | 8/2018 | C03C 3/062 |
| JP | 2018118871 A * | 8/2018 | C03C 3/062 |
| JP | 2019517987 A | 6/2019 | |
| WO | 2018/066239 A1 | 4/2018 | |

OTHER PUBLICATIONS

Official Communication issued in corresponding Chinese Patent Application No. 202180017938.2, mailed on Mar. 14, 2024.
Tanaka et al., "The Faraday effect and magneto-optical figure of merit in the visible region for lithium borate glasses containing Pr3+", Journal of Physics D: Applied Physics, vol. 31, Dec. 31, 1998, 7 pages.
Linganna et al., "Development of aluminosilicate glass fiber doped with high Pr3+ concentration for all-optical fiber isolator application", Journal of Materials Science: Materials in Electronic, vol. 30, Jun. 7, 2019, pp. 12790-12795.
Terashima et al., "Structure and Nonlinear Optical Properties of Lanthanide Borate Glasses", Journal of the American Ceramic Society, vol. 80, Issue 11, Nov. 30, 1997, pp. 2903-2909.
Official Communication issued in International Patent Application No. PCT/JP2021/011975, mailed on May 25, 2021.
Edel'man et al., "Magneto-Optics of Pr3+ in LiB3O5 Glass Matrix", Glass Physic and Chemistry vol. 26, No. 1, Mar. 2000, pp. 68-72.

* cited by examiner

*Primary Examiner* — Bijan Ahvazi
(74) *Attorney, Agent, or Firm* — Keating & Bennett, LLP

(57) ABSTRACT

Provided is a glass material having a high light transmittance in a short wavelength range and easily producible. A glass material contains, in terms of % by mole, 5 to less than 30% $Pr_2O_3$ and 0.1 to 95% $B_2O_3$.

9 Claims, No Drawings

GLASS MATERIAL

TECHNICAL FIELD

The present invention relates to a glass material suitable as a material for a magneto-optical element making up part of a magnetic device, such as an optical isolator, an optical circulator or a magnetic sensor, a material for a magnetic glass lens for use in a digital camera or the like, and a material for a glass sheet for use in a bandpass filter.

BACKGROUND ART

Glass materials containing a paramagnetic compound are known to exhibit the Faraday effect which is one of magneto-optical effects. The Faraday effect is the effect of rotating the polarization plane of linearly polarized light passing through a material placed in a magnetic field and is utilized in optical isolators, magnetic sensors, and so on.

The optical rotation $\theta$ (the angle of rotation of the polarization plane) due to the Faraday effect is expressed by the following formula using a Verdet constant V when the intensity of a magnetic field is represented by H and the length of a substance through which polarized light passes is represented by L. The Verdet constant is a constant dependent on the type of the substance, takes positive values for diamagnetic substances, and takes negative values for paramagnetic substances. As the absolute value of the Verdet constant is larger, the absolute value of the optical rotation becomes larger, that is, a greater Faraday effect is exhibited.

$$\theta = VHL$$

Examples of known glass materials exhibiting the Faraday effect include $SiO_2$—$B_2O_3$—$Al_2O_3$—$Tb_2O_3$-based glass materials (see Patent Literature 1), $P_2O_5$—$B_2O_3$—$Tb_2O_3$-based glass materials (see Patent Literature 2), and $P_2O_5$—$TbF_3$—$RF_2$— (where R represents an alkaline earth metal) based glass materials (see Patent Literature 3).

CITATION LIST

Patent Literature

[PTL 1]
JP-B-S51-46524
[PTL 2]
JP-B-S52-32881
[PTL 3]
JP-B-S55-42942

SUMMARY OF INVENTION

Technical Problem

The above glass materials exhibit high transmittances from a visible range to an infrared range, but, in a range (short wavelength range) shorter in wavelength than the visible range, decrease their light transmittance due to light absorption of $Tb_2O_3$. Therefore, if magneto-optical elements and so on using these glass materials are used in the short wavelength range, this may cause a decrease in light extraction efficiency and breakage due to heat production.

In view of the foregoing, the present invention has an object of providing a glass material having a high light transmittance in a short wavelength range and easily producible.

Solution to Problem

The inventors conducted intensive studies and, as a result, found that the above problem can be solved by a glass material having a specific composition.

Specifically, a glass material according to the present invention contains, in terms of % by mole, 5 to less than 30% $Pr_2O_3$ and 0.1 to 95% $B_2O_3$.

Since the glass material according to the present invention contains $Pr_2O_3$ as described above, it exhibits a high transmittance in a short wavelength range. As a result, it is possible to reduce the decrease in light extraction efficiency in the short wavelength range and the breakage of the magneto-optical element due to heat production. In addition, since the glass material contains $B_2O_3$ as an essential component, it can be easily vitrified and thus can be easily produced.

The glass material according to the present invention preferably further contains, in terms of % by mole, 0 to 90% $SiO_2$ and 0 to 90% $P_2O_5$.

The glass material according to the present invention preferably further contains, in terms of % by mole, 0 to 50% $Al_2O_3$.

The glass material according to the present invention preferably contains 20% or more $B_2O_3+SiO_2+P_2O_5$.

The glass material according to the present invention preferably has a light transmittance of 50% or more at a thickness of 1 mm and a wavelength of 355 nm.

The glass material according to the present invention is preferably used as a magneto-optical element.

The glass material according to the present invention is preferably used as a Faraday rotator.

Advantageous Effects of Invention

The present invention enables provision of a glass material having a high light transmittance in a short wavelength range and easily producible.

DESCRIPTION OF EMBODIMENTS

A glass material according to the present invention contains, in terms of % by mole, 5 to less than 30% $Pr_2O_3$ and 0.1 to 95% $B_2O_3$. The reasons why the glass composition is defined as above will be described below. In the following description of the contents of components, "%" refers to "% by mole" unless otherwise specified.

$Pr_2O_3$ is an essential component that increases the absolute value of the Verdet constant to increase the Faraday effect. Furthermore, $Pr_2O_3$ is also a component that contributes to increasing the magnetic susceptibility of the glass material. In addition, $Pr_2O_3$ has no light absorption peak in a short wavelength range (for example, 250 to 420 nm) and is therefore a component for obtaining a glass material having a high light transmittance in the short wavelength range. The content of $Pr_2O_3$ is 5 to less than 30%, preferably more than 5% to less than 30%, preferably 6 to less than 30%, preferably 10 to less than 30%, preferably more than 10% to less than 30%, preferably 12 to less than 30%, preferably 15 to less than 30%, preferably 15 to 29%, preferably 15 to 27%, preferably 15 to 24%, and particularly preferably 15 to 22%. If the content of $Pr_2O_3$ is too small, the absolute value of the Verdet constant becomes small, which makes it difficult to achieve a sufficient Faraday effect. On the other hand, if the content of $Pr_2O_3$ is too large, the glass material is difficult to vitrify. In addition, the short wavelength absorption edge of the glass is likely to shift toward a longer wavelength, which makes it likely that the light transmittance in the short wavelength range decreases. The content of $Pr_2O_3$ in the present invention is represented by calculationally converting all elements of Pr present in the glass to its trivalent oxides.

The magnetic moment from which the Verdet constant is derived is greater in $Pr^{3+}$ than in $Pr^{4+}$. A larger percentage of $Pr^{3+}$ in the glass material is more preferable because the Faraday effect becomes greater. Specifically, the percentage of $Pr^{3+}$ in the total content of Pr ions is, in terms of % by mole, preferably 50% or more, more preferably 60% or more, still more preferably 70% or more, yet still more preferably 80% or more, and particularly preferably 90% or more.

$B_2O_3$ is an essential component that forms a glass network and widens the vitrification range to facilitate vitrification. Furthermore, $B_2O_3$ is also a component that makes it easy to shift the short wavelength absorption edge of the glass toward a shorter wavelength. However, $B_2O_3$ does not contribute to increasing the Verdet constant. Therefore, if the content of $B_2O_3$ is too large, a sufficient Faraday effect is difficult to achieve. Hence, the content of $B_2O_3$ is 0.1 to 95%, preferably 10 to 90%, preferably 20 to 90%, preferably 25 to 90%, preferably 30 to 90%, preferably 40 to 88%, preferably 50% to 85%, preferably more than 50% to 85%, and particularly preferably 51 to 85%.

The glass material according to the present invention may contain, in addition to the above components, the following various components.

$SiO_2$ is a component that forms a glass network and makes it easy to extend the vitrification range. However, $SiO_2$ does not contribute to increasing the Verdet constant. Therefore, if the content of $SiO_2$ is too large, a sufficient Faraday effect is difficult to achieve. Hence, the content of $SiO_2$ is preferably 0 to 90%, more preferably 0 to 70%, more preferably 0 to 60%, more preferably 0 to 50%, more preferably 0 to less than 40%, more preferably 0 to 39%, more preferably 0.1 to 37%, and particularly preferably 1 to 35%.

$P_2O_5$ is a component that forms a glass network and makes it easy to extend the vitrification range. Furthermore, $P_2O_5$ is also a component that makes it easy to shift the short wavelength absorption edge of the glass toward a shorter wavelength. However, $P_2O_5$ does not contribute to increasing the Verdet constant. Therefore, if the content of $P_2O_5$ is too large, a sufficient Faraday effect is difficult to achieve. Hence, the content of $P_2O_5$ is preferably 0 to 90%, more preferably 0 to 70%, more preferably 0 to 50%, more preferably 0 to 30%, more preferably 0 to 20%, more preferably 0 to 10%, more preferably 0 to 5%, more preferably 0.1 to 5%, and particularly preferably 1 to 5%.

In order to further extend the vitrification range, $SiO_2+P_2O_5$ is preferably 0 to 90%, more preferably 0 to 80%, still more preferably 0 to 50%, yet still more preferably 0.1 to 40%, and particularly preferably 1 to 35%. If the content of $SiO_2+P_2O_5$ is too large, a sufficient Faraday effect is difficult to achieve. Note that "$SiO_2+P_2O_5$" means the total amount of the respective contents of $SiO_2$ and $P_2O_5$.

$B_2O_3+SiO_2+P_2O_5$ is preferably 20% or more, more preferably 30% or more, more preferably 40% or more, more preferably 50% or more, more preferably 51% or more, more preferably 53% or more, and particularly preferably 55% or more. Thus, the glass material becomes easier to vitrify. The upper limit of $B_2O_3+SiO_2+P_2O_5$ is, for example, preferably 95% or less and particularly preferably 90% or less. Note that "$B_2O_3+SiO_2+P_2O_5$" means the total amount of the respective contents of $B_2O_3+SiO_2$, and $P_2O_5$.

$Al_2O_3$ is a component that forms a glass network and makes it easy to extend the vitrification range. However, $Al_2O_3$ does not contribute to increasing the Verdet constant. Therefore, if the content of $Al_2O_3$ is too large, a sufficient Faraday effect is difficult to achieve. Hence, the content of $Al_2O_3$ is preferably 0 to 50%, more preferably 0 to 45%, more preferably 0.1 to 45%, more preferably 0.1 to 40%, more preferably 0.1 to 35%, more preferably 0.1 to 30%, more preferably 0.1 to 25%, more preferably 1 to 25%, and particularly preferably 1 to 20%.

$Tb_2O_3$ is a component that increases the absolute value of the Verdet constant to increase the Faraday effect. Furthermore, $Tb_2O_3$ is also a component that increases the magnetic susceptibility of the glass material. However, if its content is too large, the glass material is difficult to vitrify. In addition, the light transmittance in the short wavelength range becomes likely to decrease. Therefore, the content of $Tb_2O_3$ is preferably 0 to less than 25%, more preferably 0 to 24%, more preferably 0 to 20%, more preferably 0 to 15%, more preferably 0 to 10%, more preferably 0 to 5%, more preferably 0 to 3%, and particularly preferably 0 to 1%. The content of $Tb_2O_3$ is represented by calculationally converting all elements of Tb present in the glass to its trivalent oxides.

$Dy_2O_3$ is a component that increases the absolute value of the Verdet constant to increase the Faraday effect. Furthermore, $Dy_2O_3$ is also a component that increases the magnetic susceptibility of the glass material. However, if its content is too large, the glass material is difficult to vitrify. In addition, the light transmittance in the short wavelength range becomes likely to decrease. Therefore, the content of $Dy_2O_3$ is preferably 0 to less than 15%, more preferably 0 to 14%, more preferably 0 to 10%, more preferably 0 to 5%, more preferably 0 to 3%, and particularly preferably 0 to 1%. The content of $Dy_2O_3$ is represented by calculationally converting all elements of Dy present in the glass to its trivalent oxides.

$Ce_2O_3$, $La_2O_3$, $Gd_2O_3$, $Yb_2O_3$, and $Y_2O_3$ are components that easily increase the stability of vitrification, but an excessively large content thereof contrariwise makes the glass material difficult to vitrify. In addition, the light transmittance becomes likely to decrease. Therefore, the content of each of $Ce_2O_3$, $La_2O_3$, $Gd_2O_3$, $Yb_2O_3$, and $Y_2O_3$ is preferably 0 to 10% and particularly preferably 0 to 5%.

MgO, CaO, SrO, and BaO are components that easily increase the stability of vitrification and the chemical durability. However, these components do not contribute to increasing the Verdet constant. Therefore, if the content of them is too large, a sufficient Faraday effect is difficult to achieve. Hence, the content of each of these components is preferably 0 to 20%, more preferably 0 to 15%, and particularly preferably 0 to 10%.

$Li_2O$, $K_2O$, and $Na_2O$ are components that easily increase the stability of vitrification and easily decrease the melting temperature of the glass. However, these components do not contribute to increasing the Verdet constant. Therefore, if the content of them is too large, a sufficient Faraday effect is difficult to achieve. Hence, the content of each of these components is preferably 0 to 30%, more preferably 0 to 25%, still more preferably 0 to 20%, yet still more preferably 0 to 15%, and particularly preferably 0 to 10%.

$Ga_2O_3$ is a component that makes it easy to extend the vitrification range. However, if its content is too large, the glass material is likely to devitrify. Furthermore, $Ga_2O_3$ does not contribute to increasing the Verdet constant. Therefore, if the content of $Ga_2O_3$ is too large, a sufficient Faraday effect is difficult to achieve. Therefore, the content of $Ga_2O_3$ is preferably 0 to 35%, more preferably 0 to 20%, more preferably 0 to 10%, more preferably 0 to 5%, more preferably 0 to less than 5%, and particularly preferably 0 to 4%.

Fluorine is a component that increases the glass formation ability and makes it easy to extend the vitrification range. However, if its content is too large, fluorine volatilizes during melting to cause striae or other adverse effects, which makes it difficult to obtain homogeneous glass. Therefore, the content of fluorine (in terms of $F_2$) is preferably 0 to 10%, more preferably 0 to 7%, still more preferably 0 to 5%, and particularly preferably 0 to 4%.

$Sb_2O_3$ may be added as a reductant. However, in consideration of environmental burden, the content of $Sb_2O_3$ is preferably 0.5% or less.

Since, as described previously, the glass material according to the present invention exhibits a high light transmittance in a short wavelength range (for example, 250 to 420 nm), it can be suitably used as a magneto-optical element, such as an optical isolator, an optical circulator or a magnetic sensor, for use in this wavelength range. In doing so, its light transmittance at a thickness of 1 mm and a wavelength of 355 nm is preferably 50% or more, more preferably 60% or more, still more preferably 70% or more, and particularly preferably 80% or more. The light transmittance here is the external light transmittance including reflection.

Furthermore, since the glass material according to the present invention has the above composition, it has a good magnetic susceptibility (for example, $1 \times 10^{-4}$ emu/mol or Alternatively, the glass material according to the present invention may be formed into the shape of a glass sheet by polishing or other methods and used as a bandpass filter. In doing so, for example, the light transmittance in a wavelength range of 250 to 420 nm is preferably higher than that in a wavelength range of 420 to 500 nm. Furthermore, for example, the light transmittance in a wavelength range of 500 to 550 nm is preferably higher than that in a wavelength range of 550 to 620 nm. Moreover, for example, the light transmittance in a wavelength range of 620 to 950 nm is preferably higher than that in a wavelength range of 950 to 1200 nm.

The glass material according to the present invention is preferably produced by melting a glass raw material in a melting container, such as a crucible, and cooling it. Since, as described previously, the content of $Pr_2O_3$ in the glass material according to the present invention is limited to less than 30%, the glass material can easily vitrify and therefore can be stably produced. In addition, this production method enables melting of a large amount of glass raw material at a time as compared to a production method in which a glass raw material is melted and cooled while held levitated (a containerless levitation method). Therefore, this production method can efficiently produce a larger glass material.

EXAMPLES

The present invention will be described below with reference to examples, but the present invention is not at all limited by the following examples.

Tables 1 to 3 show examples of the present invention and comparative examples.

TABLE 1

|  | Example | | | | | | | |
|---|---|---|---|---|---|---|---|---|
|  | 1 | 2 | 3 | 4 | 5 | 6 | 7 | 8 |
| $Pr_2O_3$ | 6 | 11 | 16 | 21 | 19 | 25 | 29 | 26 |
| $B_2O_3$ | 80 | 53 | 69 | 71 | 59 | 65 | 27 | 29 |
| $SiO_2$ | 4 | 15 | 10 |  | 11 | 5 | 26 | 25 |
| $Al_2O_3$ | 10 | 20 | 5 | 8 | 11 | 5 | 16 | 15 |
| $P_2O_5$ |  | 1 |  |  |  |  | 2 | 5 |
| $B_2O_3 + SiO_2 + P_2O_5$ | 84 | 69 | 79 | 71 | 70 | 70 | 55 | 59 |
| Verdet Constant @355 nm (min/Oe · cm) | 0.255 | 0.675 | 1.115 | 1.371 | 1.266 | 1.579 | 1.668 | 1.549 |
| Transmittance @355 nm (%) | 71.1 | 69.8 | 68.8 | 66.6 | 65.3 | 61.2 | 59.6 | 55.3 | more and particularly $2 \times 10^{-4}$ emu/mol or more at room temperature). Therefore, the glass material according to the present invention may be molded into a lens shape by press molding or other methods and used as an autofocus magnetic glass lens for a digital camera, a camera-equipped mobile phone or the like. Generally, these types of cameras are provided with, as a drive unit for changing the focal distance, a lens holder for fixing the lens and an elastic body for moving the lens holder, which makes it difficult to reduce the cameras in size. To cope with this, a method is proposed for moving the lens (a magnetic glass lens) with a magnet instead of the above drive unit. Since, as described above, the glass material according to the present invention has a good magnetic susceptibility, it can be produced into an autofocus magnetic glass lens sufficiently movable even with the use of a small magnet and therefore can contribute to size reduction of cameras and so on.

TABLE 2

|  | Comparative Example | | |
|---|---|---|---|
|  | 1 | 2 | 3 |
| $Pr_2O_3$ | 50 | 50 |  |
| $Tb_2O_3$ |  |  | 25 |
| $B_2O_3$ | 30 | 30 | 30 |
| $SiO_2$ |  |  | 25 |
| $Al_2O_3$ | 20 | 20 | 20 |
| $P_2O_5$ |  |  |  |
| $B_2O_3 + SiO_2 + P_2O_5$ | 30 | 30 | 55 |
| Verdet Constant @355 nm (min/Oe · cm) | not | 2.233 | 3.68 |
| Transmittance @355 nm (%) | vitrified | 45.2 | 39.6 |

TABLE 3

| | Example | | | | | | | Comparative Example |
|---|---|---|---|---|---|---|---|---|
| | 1 | 2 | 3 | 4 | 5 | 7 | 8 | 2 |
| Tg (° C.) | unmeasured | unmeasured | unmeasured | 660 | 665 | 712 | 705 | 751 |
| Tc (° C.) | unmeasured | unmeasured | unmeasured | 882 | 928 | 893 | 899 | 863 |
| ΔT (° C.) | unmeasured | unmeasured | unmeasured | 222 | 263 | 181 | 194 | 112 |

Examples 1 to 8 and Comparative Examples 1 and 3 were produced in the following manner. First, raw material powders were weighed to give a pertinent glass composition shown in the tables and well mixed, thus forming a glass raw material. Next, approximately 100 g of glass raw material was put into a platinum crucible and stirred with a platinum stirring rod while melted at 1200° C. to 1500° C. in an electric furnace, thus clarifying and homogenizing it. Finally, the molten glass was formed into shape by pouring it onto a carbon plate, thus forming a glass material.

Comparative Example 2 was produced in the following manner. First, raw material powders were weighed to give a pertinent glass composition shown in the tables and well mixed, thus forming a glass raw material. Next, approximately 0.5 g of glass raw material was press-formed and sintered at 800° C. for six hours, thus producing a block of glass raw material. Finally, the block of glass raw material was placed in a containerless levitation apparatus, levitated using nitrogen gas, melted by irradiation with $CO_2$ laser, and then cooled, thus producing a glass material.

The obtained glass materials were measured in terms of the Verdet constant at a wavelength of 355 nm and the light transmittance at a wavelength of 355 nm. Furthermore, as for Examples 1 to 8 and Comparative Example 2, the glass materials were measured in terms of glass transition temperature (Tg) and crystallization temperature (Tc). The measurements were conducted in the following manners.

The Verdet constant at a wavelength of 355 nm was measured with a Faraday rotation measurement device (manufactured by JASCO Corporation). Specifically, each obtained glass material was polished to have a thickness of 1 mm, the obtained piece was measured in terms of Faraday rotation angle at a wavelength of 355 nm in a magnetic field of 12.5 kOe, and the Verdet constant was then calculated.

The light transmittance at a wavelength of 355 nm was measured with a spectro-photometer (UV-3100 manufactured by Shimadzu Corporation). Specifically, each obtained glass material was polished to have a thickness of 1 mm, the obtained piece was measured in terms of light transmittance at a wavelength of 300 to 400 nm to obtain a light transmittance curve, and the light transmittance at a wavelength of 355 nm was read from the light transmittance curve. The light transmittance is the external light transmittance including reflection.

The glass transition temperature (Tg) and the crystallization temperature (Tc) were measured with a macro differential thermal analyzer. Specifically, in a chart obtained by measuring each glass material up to 1100° C. with the macro differential thermal analyzer, the value of a first inflection point was considered as the glass transition point and a strong exothermic peak was considered as the crystallization temperature. The difference between the glass transition point and the crystallization temperature was represented by ΔT and used as an index of ease of vitrification. A larger ΔT means a higher ease of vitrification.

As seen from Tables 1 and 2, the glass materials in Examples 1 to 8 exhibited a Verdet constant of 0.255 to 1.668 at a wavelength of 355 nm and their light transmittance at a wavelength of 355 nm was as high as more than 50%. On the other hand, the glass material in Comparative Example 1 was not vitrified by the molding method including melting in the platinum crucible and pouring of the melt onto the plate. The glass material in Comparative Example 2 was vitrified by the containerless levitation method, but exhibited a light transmittance as low as 45.2% at a wavelength of 355 nm, that is, its low light transmittance in a short wavelength range was low. The glass material in Comparative Example 3 exhibited a light transmittance as low as 39.6% at a wavelength of 355 nm, that is, its light transmittance in a short wavelength range was low.

Furthermore, as seen from Table 3, the glasses in Examples 4, 5, 7, and 8 exhibited ΔT as high as 181 to 263° C. In contrast, the glass in Comparative Example 2 exhibited ΔT as low as 112° C.

INDUSTRIAL APPLICABILITY

The glass material according to the present invention is suitable as a material for a magneto-optical element making up part of a magnetic device, such as an optical isolator, an optical circulator or a magnetic sensor, a material for a magnetic glass lens for use in a digital camera or the like, and a material for a glass sheet for use in a bandpass filter.

The invention claimed is:

1. A glass material containing, in terms of % by mole, 5 to 29% $Pr_2O_3$, 53 to 95% $B_2O_3$, 0 to 24% $Tb_2O_3$, 0 to 10% $Dy_2O_3$, and 71% or more of $B_2O_3+SiO_2+P_2O_5$.

2. The glass material according to claim 1, further containing, in terms of % by mole, 0 to less than 40% $SiO_2$ and 0 to 30% $P_2O_5$.

3. The glass material according to claim 1, further containing, in terms of % by mole, 0 to 40% $Al_2O_3$.

4. The glass material according to claim 1, having a light transmittance of 50% or more at a thickness of 1 mm and a wavelength of 355 nm.

5. The glass material according to claim 1, being used as a magneto-optical element.

6. The glass material according to claim 5, being used as a Faraday rotator.

7. The glass material according to claim 1, containing, in terms of % by mole, 59 to 95% $B_2O_3$.

8. The glass material according to claim 1, containing, in terms of % by mole, 0 to 5% $Dy_2O_3$.

9. The glass material according to claim 1, containing, in terms of % by mole, 59 to 95% $B_2O_3$ and 0 to 5% $Dy_2O_3$.

* * * * *